United States Patent [19]

Schwartz et al.

[11] Patent Number: 4,973,884

[45] Date of Patent: Nov. 27, 1990

[54] SUBSTITUTE LAMP MODULE FOR PROJECTORS

[75] Inventors: Morris Schwartz, 6455 La Jolla Blvd., La Jolla, Calif. 92037; Lynn Jaquish, San Diego, Calif.

[73] Assignee: Morris Schwartz, Laguna Hills, Calif.

[21] Appl. No.: 350,641

[22] Filed: May 10, 1989

[51] Int. Cl.[5] ................................................ H04N 3/36

[52] U.S. Cl. ...................................... 315/306; 358/54; 358/214

[58] Field of Search ................... 315/200 R, 291, 306; 358/54, 214

[56] References Cited

U.S. PATENT DOCUMENTS 4,698,683 10/1987 Schwartz et al. ................ 358/54 X

*Primary Examiner*—Robert J. Pascal

[57] ABSTRACT

A low light level lamp module for slide projectors is provided as a substitute for the normal lamp module using high-wattage, high-brightness lamps to permit using the projector with a conversion kit which allows the slides to be viewed on a video receiver.

1 Claim, 1 Drawing Sheet

SUBSTITUTE LAMP MODULE FOR PROJECTORS

BACKGROUND OF THE INVENTION

1. Field of the Invention

This invention relates to the displaying on a television screen the images on photographic transparencies or slides and relates to the light source for a conversion kit for adapting a conventional slide projector for projecting pictures on a video screen.

2. Description of the Prior Art

This invention is a modification of and improvement over U.S. Pat. No. 4698683 entitled Video Conversion Kit for Projector and issued to one of the coinventors of the present invention. The various objects of U.S. Pat. No. 4698683 include that of reducing the level of light and heat passing through the slide being projected, to thereby prolong the life of the slide and protect the dye colors of the image in addition to providing a convenient and more economical means of illumination for the slide.

SUMMARY OF THE INVENTION

The primary object of the invention is to provide a simple, low-cost, long life, low-voltage low-light-output lamp module to be substituted for the normal costly high-wattage high heat level projector light source. Thus, this invention goes counter to usual demands in a projector in which higher wattage and higher brightness light sources are the usual design goals; the object normally is to deliver the maximum number of lumens to the projector screen. This usual objective is achieved through use of a lamp module using a high brightness lamp having an integral reflector, usually of the dichroic type. Typical of such projectors are the Eastman Kodak Carousel ® and Ektagraphic ®.

The lamp conversion modules shown in U.S. Pat. No. 4698683, while usable, either, in one example, employ a wattage which is considerably higher than the optimum, or, in two other examples, either require additional optics or a voltage reducing transformer. The present invention simplifies the structure and reduces the weight and cost of the earlier substitute lamp modules and provides a more convenient means for inserting the lamp module.

BRIEF DESCRIPTION OF THE DRAWING

FIG. 3 is a plan view of the underside of the substitute lamp module and

FIG. 4 is a side view of the substitute lamp module.

FIG. 1 is a partial plan view of a projector of the type to which the present invention is directed, i.e., the Eastman Kodak Ektagraphic ®, Medalist ®, and Carousel ®. The projector housing is shown at 10 in phantom view and the original lamp module at 12. A pair of contacts in a terminal block 14 in the projector body is engaged by a pair of pins 16 which carry household current to a lamp 20 held by a socket 18. Light from the lamp is reflected by mirror 22 through heat filter 24 and to a condenser lens 26, through a transparency (not shown) and to a projection lens (not shown). Module 12 is inserted into and removed from projector housing 10 via a door shown generally at 27. The module slides in through the door opening and is supported within the projector housing by means of downturned flanges 28 at each side of the module.

Figure 1:
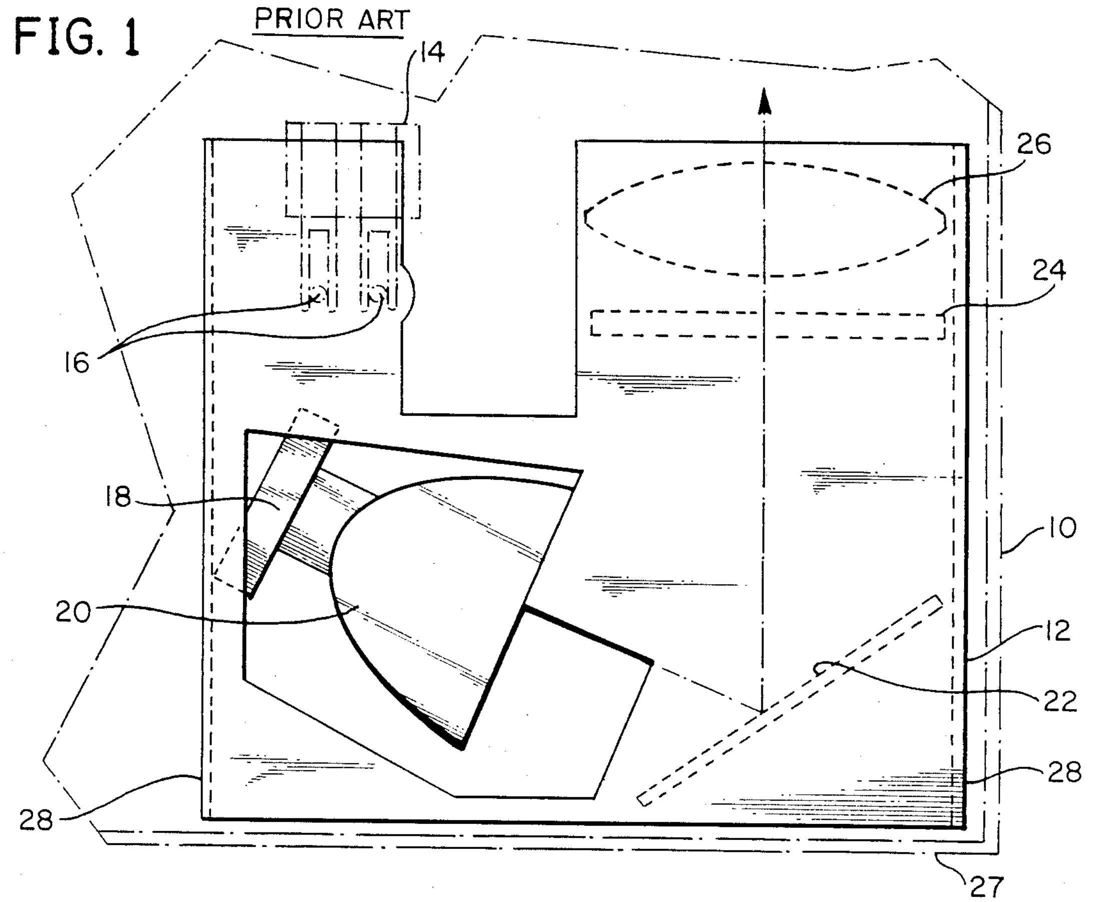
FIG. 1 is a partial plan view of a widely used slide projector with its normal lamp module in place.
Figure 2:
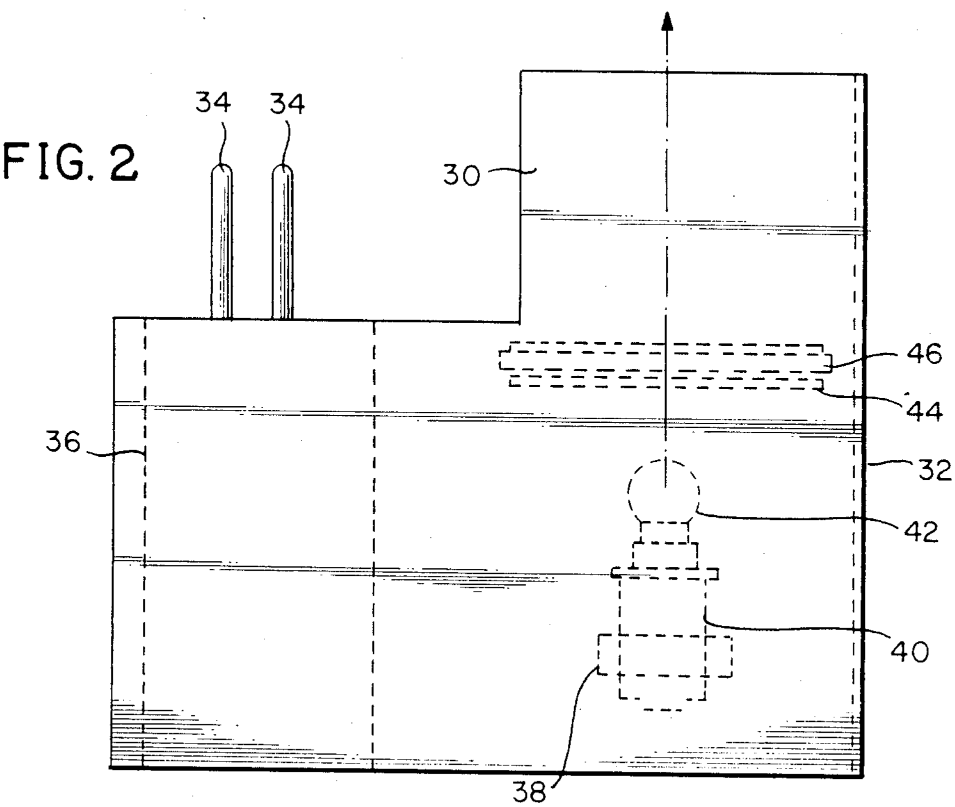
FIG. 2 is a plan view of the substitute lamp module in position for convenient insertion into the projector.

The lamp module of the present invention is shown in FIGS. 2, 3 and 4. The lamp module comprises a support plate 30 provided with a downturned flange 32 along one side and carries on its under side a pair of electrical terminal pins 34, a voltage reducing module 36, a lamp socket holder 38, a lamp socket 40 and a lamp 42. It also carries a bracket 44 which in turn holds a light diffusing plate 46 made of a white acrylic sheet.

The voltage reducing module, with its cover partly broken away, best illustrates its structure. Terminal pins 34 are supported in an insulating block 48. One pin, at its inner end, is electrically connected to one terminal of socket 40. The other pin is connected via a diode 50 and a resistor 52 to the other terminal of socket 40. In this specific instance lamp 42 is a 12 volt lamp of 2 candle power output, type 1895. The light output of the lamp is a minute fraction of the light output of the 300 watt lamp designated EXR which is the usual lamp for the Ektagraphic ® and Carousel ® projectors.

Lamp 42 is an ordinary automotive lamp, in this case operating at 12 volts. Other lamps of similar light output are available for 6 to 24 volt operation and will function equally well in the present invention.

We claim:

1. A substitute lamp module for use in place of the normal lamp module in a projector having electrical contact means for powering said normal lamp module, said substitute lamp module comprising a generally "L"-shaped plate carrying at its under side a low voltage lamp of less than 5 candlepower output, a light diffusor plate spaced from and receiving light from said lamp, a pair of electrical terminals extending from one leg of the "L" to contact said electrical contact means when the substitute lamp module is substituted for the normal lamp module, said terminals being connected to said lamp through a voltage reducing unit.

* * * * *